July 16, 1963   R. BECKER   3,098,107
METHOD FOR PRODUCING ETHYLENE
Filed May 22, 1959   3 Sheets-Sheet 1

INVENTOR
RUDOLF BECKER

BY *Toulmin & Toulmin*

ATTORNEYS

United States Patent Office 3,098,107
Patented July 16, 1963

3,098,107
METHOD FOR PRODUCING ETHYLENE
Rudolf Becker, Munich-Solln, Germany, assignor to Gesellschaft fur Linde's Eismaschinen Aktiengesellschaft, Munich, Germany, a German company
Filed May 22, 1959, Ser. No. 815,217
4 Claims. (Cl. 260—677)

The present invention relates to a method for producing ethylene. More in particular, the present invention relates to a method for producing pure ethylene obtained in the process of distilling or fractionating oil, coal, gasoline or ethane.

It is known in the art to obtain pure ethylene from crude ethylene or ethylene-containing mixtures mainly by three different methods:

According to one method which operates with low temperatures ethylene is obtained in a process similar to the fractionated distillation of air.

Another method uses a solvent as a washing agent for the crude ethylene and a third method operates by adsorption. In order to obtain a pure product, each of these known methods must perform several fractionating steps due to the fact that the ethylene only passes into the liquid phase or comes into contact with the solvent or the adsorbing agent jointly with acetylene and ethane and must then be separated from these two substances. It has also become known to combine the afore-mentioned three different methods in order to obtain a particularly pure ethylene and to remove all acetylene, since freedom from acetylene is particularly important in the processing of ethylene to obtain polyethylene, ethyl alcohol or ethylene oxide. It has therefore been suggested to remove the acetylene from a $C_2$ fraction by washing with acetone. The acetone washing is done either before or after the separation of the ethylene from ethane. This known method is, however, accompanied by grave disadvantages. In the first instance, i.e. if the washing is done before the separation of ethylene from ethane, the quantity of gas to be processed and hence the required amount of solvent are very great which results in considerable losses of energy required for cooling these amounts of solvent. Further losses of cooling energy are caused by the fact that the $C_3$ hydrocarbons are also separated, but that it is not possible to recuperate the heat produced thereby. A further disadvantage resides in the fact that acetylene may accidentally enter the wash column where it pollutes the pure ethylene for a prolonged time. If, on the other hand, the acetone washing is done after separating the ethylene and ethane, a greater amount of energy is required due to the pressure drop in the separating column. Several acetone pumps are required or the washing column must be mounted in an elevated position in order to have a natural slope for the acetone. In addition, the washing temperature is close to the melting temperature of the acetone and consequently there is the danger that the latter will freeze.

It is an object of the present invention to provide a method and an apparatus for producing pure ethylene whereby temperature energy losses are reduced to a minimum.

It is another object of the present invention to provide a method and an apparatus for producing pure ethylene whereby the amount of pressure energy required in the process is greatly reduced.

These objects are achieved, and the disadvantages of the known processes are avoided by the method of the present invention, according to which acetylene-containing ethylene is separated from ethane at substantially normal atmospheric pressure, whereupon it is compressed to about four atmospheres, cooled, and, prior to its liquefaction, branching off a portion of the ethylene from the circulation, and washing this latter portion with a suitable solvent such as, e.g. acetone or methanol, at the afore-mentioned pressure of about four atmospheres.

The apparatus of the present invention comprises a circulation compressor having a capacity of about four atmospheres, a rectifying column and a wash column, and a detensioning valve, the compressor being connected directly with the wash column, establishing a pressure of about four atmospheres in the latter, and being connected with the rectifying column via the detensioning valve, establishing normal atmospheric pressure in the rectifying column.

The invention will next be described in greater detail with reference to the accompanying drawings, wherein FIGURE 1 is a diagram illustrating the various steps in the process of the invention;

Figure 1:
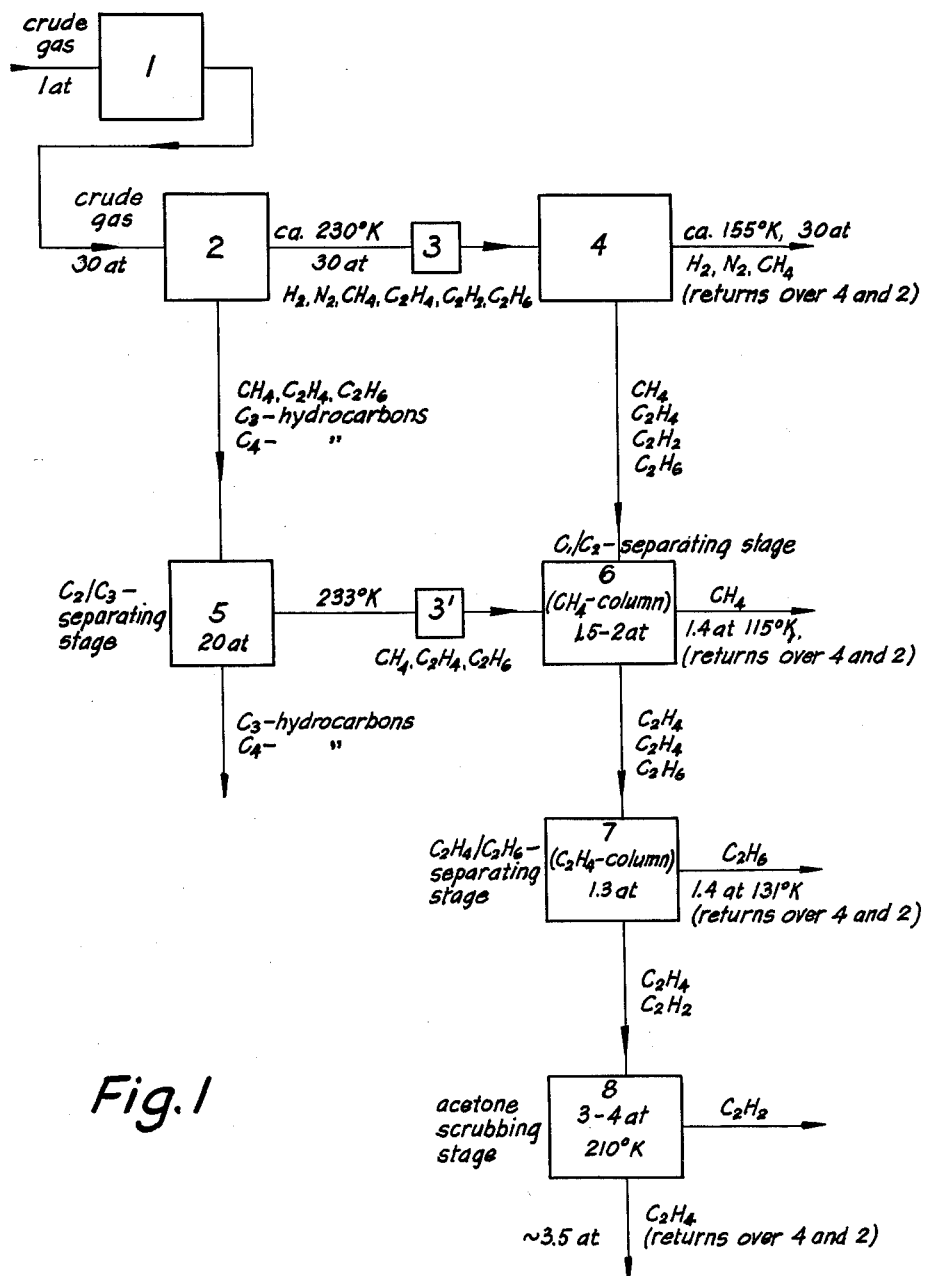
Figure 2:
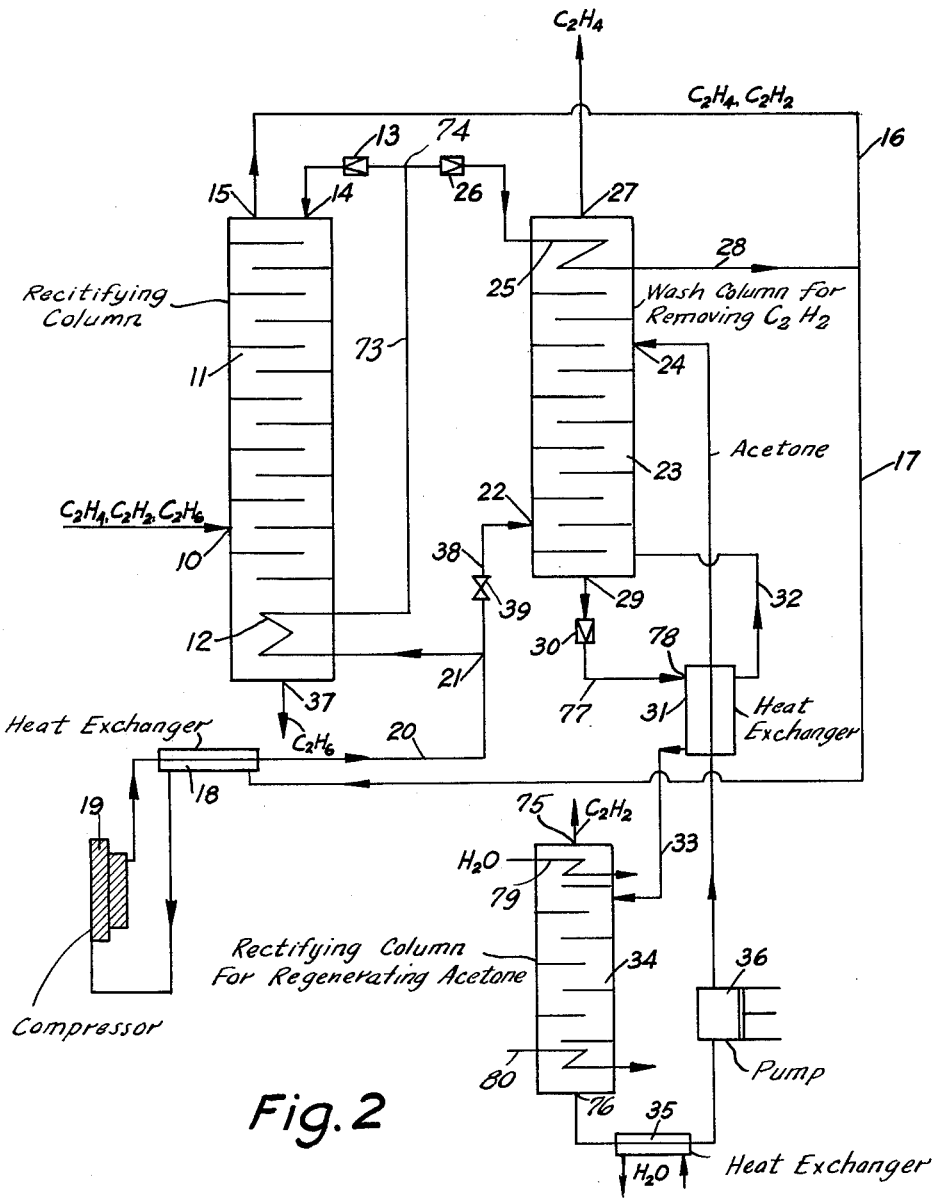
FIGURE 2 is a schematic view of the rectifying and washing system in the apparatus of the invention.
Figure 3:
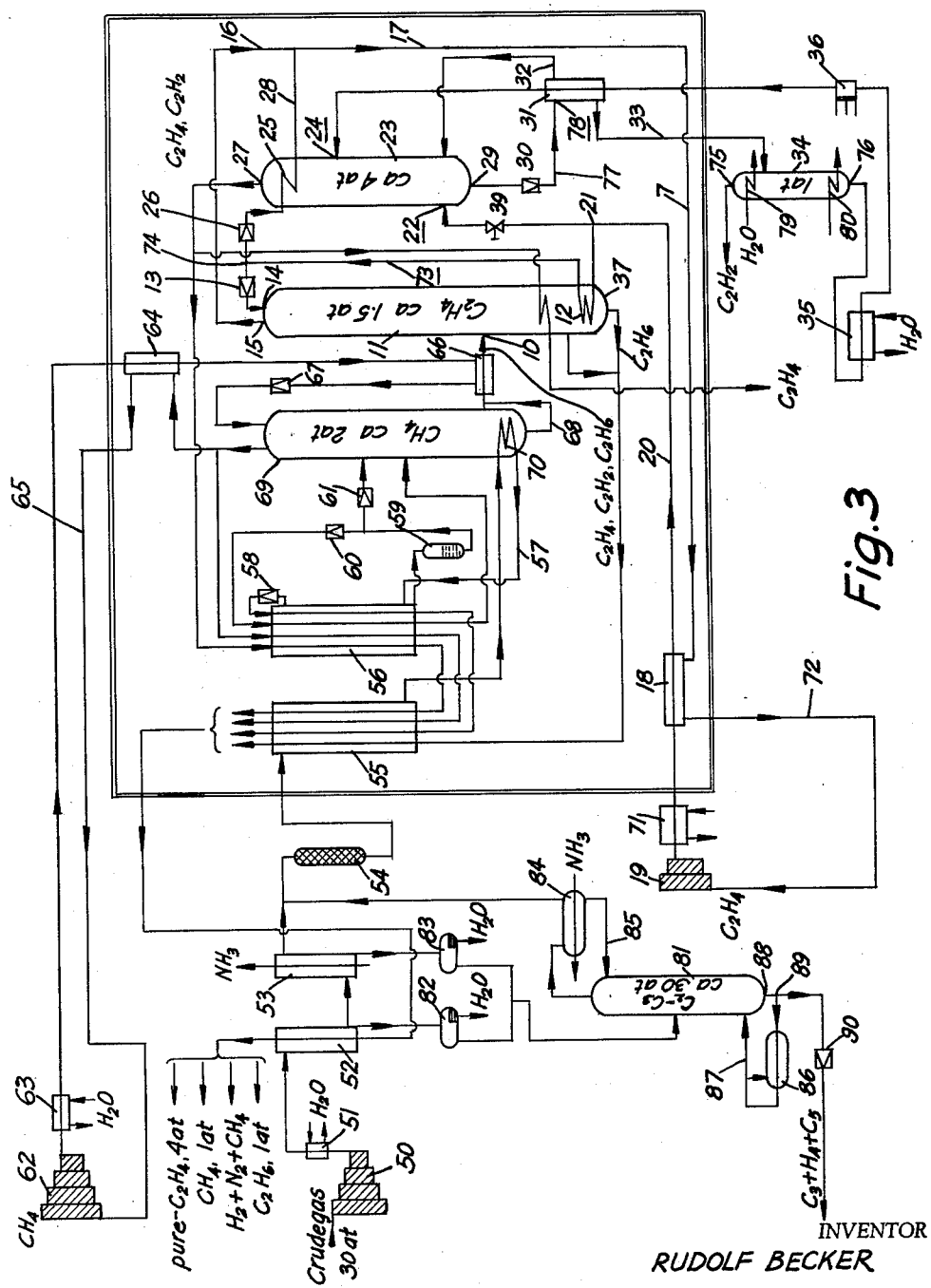
FIGURE 3 is a somewhat schematic view of the integral apparatus for producing ethylene of the invention.

Referring now to the drawings more in detail and turning first to FIGURE 1, according to the method of the invention, a mixture of crude gas is first compressed to 30 atmospheres (step one). It is then pre-cooled to about 230° Kelvin (step two). As a result, the $C_3$ and higher hydrocarbons are obtained in the liquid phase. The remaining gaseous mixture which still contains $H_2$, $N_2$, $CH_4$, $C_2H_4$, $C_2H_2$, and $C_2H_6$ is then dried (step three), whereupon it is cooled to about 155° Kelvin, still at a pressure of 30 atmospheres (step four). The non-condensed portion consisting of $H_2$, $N_2$ and a portion of the $CH_4$ is recirculated for cooling during the steps two and four. The condensate obtained in the course of the pre-cooling step two is then brought to a pressure of 20 atmospheres and a temperature of 233° Kelvin, whereupon the $C_3$ and higher hydrocarbons are separated (step five), while the methane, ethylene and ethane are dried (step 3′) and are passed, together with the condensate of step four, to a $CH_4$ column, whereupon the $CH_4$ is separated at a pressure of 1.5 to 2 atmospheres (step six). The methane has a temperature of 115° Kelvin which it exchanges to the crude gas during steps two and four. The liquid fraction resulting from step six consists of ethylene, acetylene and ethane only, from which mixture the $C_2H_6$ is separated by rectification at a pressure of about 1.3 atmospheres (step seven). Its temperature is then exchanged to the crude gas as in steps two and four. Thereafter, the gaseous mixture of ethylene and acetylene is washed at a pressure of about 3 to 4 atmospheres and a temperature of 210° Kelvin, thereby separating the pure acetylene (step eight). After heat exchange with the crude gas in steps two and four, the pure acetylene can then be further processed in a manner known per se.

The apparatus of the invention comprises the following elements arranged in the following sequence:

First there is provided a crude gas compressor 50 connected by a pipe conduit system with an after-cooler 51, the heat exchangers 52, 53, the gel-dryer 54, the latter communicating with the heat exchangers 55, 56, both of which are connected with the reboiler 70. The reboiler 70 is disposed within the methane column 69. The reboiler 70 is connected with the return portion 57 of the pipe conduit system to heat exchanger 56, the latter bearing at its upper end an expansion valve 58. Between the column 69 and the heat exchanger 56 there is provided a collecting van 59 communicating with two valves 60 and 61, valve 61 also communicating with column 69, valve 60 also communicating with heat exchanger 56.

The apparatus further comprises a circulation compressor 62 connected with a cooler 63, the latter communicating via a pipe conduit system with a heat exchanger 64.

A return portion of the pipe conduit system 65 leads back to the circulation compressor 62. The heat exchanger 64 is also connected with the column 69 and with a further heat exchanger 66. This heat exchanger 66 is connected with the head of column 69 via an expansion valve 67 and with the bottom of column 69 by a pipe conduit portion 68.

The apparatus also comprises an ethylene column 11 (rectifying column) which communicates in its lower central portion with the bottom of the methane column 69 via the heat exchanger 66. The column 11 is also connected at its head with an outlet 15 connected to a pipe conduit 16. The latter communicates with pipes 17 and 7. Within the bottom portion of column 11 there is disposed the boiler 12.

Furthermore, the apparatus comprises a circulation compressor 19 communicating with the after-cooler 71, the latter communicating with the heat exchanger 18, the latter being also connected directly to the circulation compressor via a return pipe portion 72. The heat exchanger 18 communicates with the boiler 12 via the pipe 20 branching off as at 21 and with the valve 39, the latter communicating with the wash column 23 via the pipe 38 and inlet 22. The boiler 12 is connected with a pipe 73 which branches off as at 74 and communicates, on the one hand, with the head of column 11 via pressure reducing valve 13 and inlet 14, and, on the other hand, with the condenser 25 disposed in the upper portion of column 23 via valve 26. The condenser 25 communicates with pipe 17 via pipe 28, and thereby with exchanger 18.

The head of column 23 communicates with the heat exchanger 56 via the outlet 27. From there communication is established with heat exchanger 55 and heat exchanger 52. Heat exchanger 55 also communicates with the bottom of column 11 through outlet 37 in the latter.

The bottom of column 23 communicates with heat exchanger 31 via the outlet 29 and valve 30, by a pipe portion 77 branching off within the exchanger 31 as at 78, one end of the branching leading back to column 23 via the return pipe 32, the other end communicating with the regenerating column 34 via pipe 33. The regenerating column 34 has at its head an outlet 75 and at its bottom portion an outlet 76 which latter is connected with a water cooler 35, the latter being connected with a pump 36, which, in turn, is connected with column 23 via heat exchanger 31 and inlet 24.

In the head portion of regenerating column 34 there is disposed a water cooler 79 and in its bottom portion there is arranged a boiler 80.

The apparatus is further provided with a $C_2$—$C_3$ column 81 communicating with the heat exchangers 52 and 53 via the separators 82 and 83, respectively. At its head portion the column 81 is connected with a condenser 84, which latter communicates the gel-dryer 54. The condenser 84 is again connected with the column 81 by a return pipe portion 85. The bottom of column 81 has an outlet 88 connected with a pipe stud branching off as at 89, one end being connected to the boiler 86, the latter being again connected with colum 81 by the return pipe 87. The other end is connected to an expansion valve 90 leading to the outlet (not shown).

*Operation*

The operation of the afore-described apparatus will next be described. In its operation, the apparatus comprises two different circulation systems and one gas feeding and processing system.

The first circulation system starts with the circulation pump 62 conveying $CH_4$ through the aftercooler 63, the heat exchanger 64, the heat exchanger 66, the expansion valve 67, the methane column 69; the $CH_4$ then leaves the column 69 at the top, enters the heat exchanger 64 and is returned via the pipe 65 to the circulation compressor 62.

The second circulation system starts with the compressor 19 where $C_2H_4$ is conveyed to the after-cooler 71, through the heat exchanger 18, from where it is passed to the boiler 12, within the column 11. It then passes through pipe 73, the valve 26, the condenser 25, pipe 28, pipe 17, pipe 7, back to heat exchanger 18, pipe 72 and compressor 19.

The gas feeding and processing system which conveys crude gas such as, for example, ethylene, acetylene, ethane and various other hydrocarbons starts with the compressor 50. The gas flows through the after-cooler 51, the heat exchanger 52, heat exchanger 53, the gel-dryer 54, heat exchanger 55, the boiler 70 in the bottom of methane column 69, from where it is returned to heat exchanger 56, where it branches off. One portion flows through expansion valve 58 back to the heat exchanger 56, from where it is passed to heat exchanger 55, which it leaves, whereupon it passes through the heat exchanger 52, whereupon it leaves the apparatus. The other portion leaves the heat exchanger 56 and passes into collecting van 59. Upon leaving the same this portion branches off one subportion, passing through expansion valve 60 and re-enters heat exchanger 56, passes through the same and then is conveyed into the methane column 69 at a point somewhat below the central portion of the same. The other subportion passes through expansion valve 61 and enters the methane column 69 at a point somewhat above the central portion thereof. The methane gas leaves the column at its top portion, a part of it being introduced into the first circulation system described above through the heat exchanger 64. The other part passes through heat exchanger 56, then through heat exchanger 55 and is conveyed through heat exchanger 52 which it leaves thereby simultaneously leaving the apparatus.

The crude gas mixture is compressed in the compressor 50 to an atmospheric pressure of 30 (step 1 in FIGURE 1). It is cooled in the heat exchangers 52, 53 to 230° Kelvin (step 2 in FIGURE 1). The $C_2$ and higher hydrocarbons as well as methane, ethylene, and ethane are obtained in the liquid phase and are passed into the separators 82, 83, from where they pass into the $C_2$—$C_3$ column 81. The lower hydrocarbons $C_2$, $C_3$, enter the boiler 86 and are returned to column 81 through pipe 87 in the vapor phase. The higher hydrocarbons $C_3$, $C_4$, $C_5$ leave the column 81 and leave the apparatus through valve 90. The lower hydrocarbons in the vapor phase leave the column 81 at its head, pass through condenser 84, the condensed portions re-entering column 81, the gases being passed into gel-dryer 54 where they unite with the gases conveyed directly through heat exchangers 52, 53. In the gel-dryer 54 the gas mixture which still contains $H_2$, $N_2$, $CH_4$, $C_2H_4$, $C_2H_2$, and $C_2H_6$ is dried (step 3 in FIGURE 1).

Thereafter the dried gas mixture is passed through the heat exchanger 55 and to boiler 70, where it exchanges its heat, and is passed to heat exchanger 56 where it is further cooled all while having a pressure of 30 atmospheres. It is cooled down to about 155° Kelvin (step 4 in FIGURE 1). The condensed portion is passed to the separator 59 and into column 69. Through the valve 61 its pressure is reduced to a pressure of about 2 atmospheres.

The methane in column 69 has a temperature of 115° Kelvin. It leaves the column 69 at its head and exchanges its temperature to the crude gas in the heat exchangers 56 and 55.

The liquid portion of the mixture collects at the bottom of column 69 and consists of ethylene, acetylene and ethane only. It then enters the column 11 where the $C_2H_6$ is separated by rectification at about a pressure of 1.3 atmospheres (step 7 in FIGURE 1). The liquid $C_2H_6$ leaves the column 11 at its bottom, is passed through heat exchanger 55, exchanging heat to the crude gas therein and then leaves the apparatus. The ethylene-acetylene mixture in the vapor phase leaves the column 11 at its head through outlet 15 and passes through pipe 16.

The bottom of column 11 is heated by boiler 12 in which C₂H₂-containing circulation ethylene condenses as a cooling agent. The reflux for this column is formed by acetylene-containing circulation ethylene which is decompressed in valve 13 and enters the column through inlet 14. Liquid ethane is obtained through outlet 37 in the bottom of column 11. A gaseous mixture of acetylene and ethylene leaves column 11 through outlet 15 in the head portion and passes through pipes 16 and 17 into the cooler 18, where it is heated by an already compressed acetylene-containing circulation ethylene. After its compression in compressor 19 and cooling in heat exchanger 18 the acetylene-containing ethylene reaches the branching-off point 21 over pipe 20. A portion of the gas is liquefied in boiler 12, decompressed in valve 13 and returned into column 11. The other portion is introduced into the wash column 23 through inlet 22, via valve 39 and pipe 38, column 23 having a pressure of 4 atmospheres. Somewhat below the head pure acetone is fed into column 23 through inlet 24. This acetone separates the acetylene from the gas stream. The solvent vapors are condensed in condenser 25 and consequently pure ethylene having a pressure of about 3.5 atmospheres is obtained at outlet 27. A portion of the circulation ethylene liquefied by boiler 12 is decompressed by valve 13 while the other portion is decompressed by valve 26, cools the condenser 25 and passes into pipe 17 and heat exchanger 18 through pipe 28 together with the acetylene-containing ethylene obtained from column 11. The acetone charged with acetylene and some ethylene leaves wash column 23 through outlet 29 and is decompressed by valve 30 to somewhat an excess of normal atmospheric pressure and is introduced into exchanger 31. In the latter it is heated by regenerated and compressed acetone until the ethylene evades from the solution. This ethylene is fed into column 23 through pipe 32. The acetylene-containing acetone which is thus free from ethylene then reaches the regenerating column 34 through pipe 33. The bottom of column 34 is heated by boiler 80 and the solvent vapors rising together with the acetylene are condensed by means of the cooler 79. Pure acetone is obtained at the bottom of the column. After cooling in the cooler 35 the acetone is brought to the pressure of the washing column by means of pump 36, and then is cooled in the exchanger 31 and fed into column 23 through 24.

The method of the invention is further illustrated by the following example:

About 10,000 m.³ of a crude gas are taken in one hour of a continuous process, having the following composition:

| | Percent |
|---|---|
| $H_2$ | 15.0 |
| $N_2$ | 2.0 |
| $CH_4$ | 35.0 |
| $C_2H_4$ | 20.7 |
| $C_2H_2$ | 0.3 |
| $C_2H_6$ | 15.0 |
| $C_3H_6$ | 9.0 |
| $C_4H_{10}$ | 3.0 |
| | 100.0 |

The mixture of crude gas is subjected to the eight steps at the pressures and temperatures mentioned supra; the washing (step eight) is effected with 1400 kilograms of acetone.

The gas balance of the process is as follows: (expressed in m.³)

| | |
|---|---|
| Residual gas | 3,288 |
| $CH_4$ | 1,920 |
| $C_2H_4$ | 2,004 |
| $C_2H_6$ | 1,616 |
| $C_2H_2$ | 25 |
| $C_3+$ | 1,127 |

It will be understood that this invention is susceptible to modifications and it is intended to comprise these modifications as may fall within the scope of the appended claims.

What I claim is:

1. In a method for producing pure ethylene free of acetylene and ethane by:
    (1) rectifying in a distillation column a mixture consisting essentially of ethylene with acetylene and ethane as impurities, thereby producing liquid ethane as bottoms and a vaporous mixture of ethylene-acetylene as overhead product; and
    (2) purifying the overhead product by washing with a solvent to remove the acetylene impurity; the improvement which comprises compressing the overhead product leaving the distillation column, cooling the same, and prior to its liquefaction, branching off a predetermined portion of the ethylene-acetylene and washing this latter portion with a solvent to remove the acetylene impurity; and passing the remaining portion of the ethylene-acetylene, in indirect heat-transfer relationship, through the contents of the bottom of the distillation column, thereby supplying heat for the operation of said column and simultaneously condensing the ethylene-acetylene; and utilizing at least a portion of said condensed ethylene-acetylene as reflux for the operation of said distillation column.

2. In a method for producing pure ethylene free of acetylene and ethane by:
    (1) rectifying in a distillation column operating at 1.3 atmospheres a mixture consisting essentially of ethylene with acetylene and ethane as impurities to produce liquid ethane as bottoms and a vaporous mixture of ethylene and acetylene as overhead product; and
    (2) purifying the overhead product by washing with acetone in a wash column to remove the acetylene impurity; the improvement which comprises compressing the overhead product leaving the distillation column to about 4 atmospheres, cooling the same, and, prior to its liquefaction, branching off a predetermined portion of the ethylene-acetylene and washing this latter portion at a pressure of substantially 4 atmospheres with acetone; and passing the remaining portion of the ethylene-acetylene in indirect heat-transfer relationship to the contents of the bottom of the distillation column, thereby supplying heat for the operation of said column and condensing the ethylene-acetylene; reducing the pressure of at least a portion of said condensed ethylene-acetylene leaving the bottom of the distillation column, and utilizing same as reflux for the operation of said column.

3. The method of claim 2, wherein at least a portion of the condensed ethylene-acetylene is passed in indirect heat-transfer relationship, through the contents at the top of the wash column, to condense some ethylene, thereby scrubbing out the acetone.

4. The method of claim 2 wherein the acetone wash is conducted at a temperature of about 210° K.

References Cited in the file of this patent

UNITED STATES PATENTS

| | | |
|---|---|---|
| 1,942,131 | Baumann et al. | Jan. 2, 1934 |
| 1,958,553 | Van Nuys | May 15, 1934 |
| 2,299,830 | Legatski et al. | Oct. 27, 1942 |
| 2,471,550 | Shaw | May 31, 1949 |
| 2,511,206 | Hasche | June 13, 1950 |
| 2,657,761 | Cines | Nov. 3, 1953 |
| 2,804,488 | Cobb | Aug. 27, 1957 |
| 2,809,710 | Hachmuth | Oct. 15, 1957 |
| 2,938,934 | Williams | May 31, 1960 |
| 2,947,180 | Koble et al. | Mar. 7, 1961 |